Figure 2:
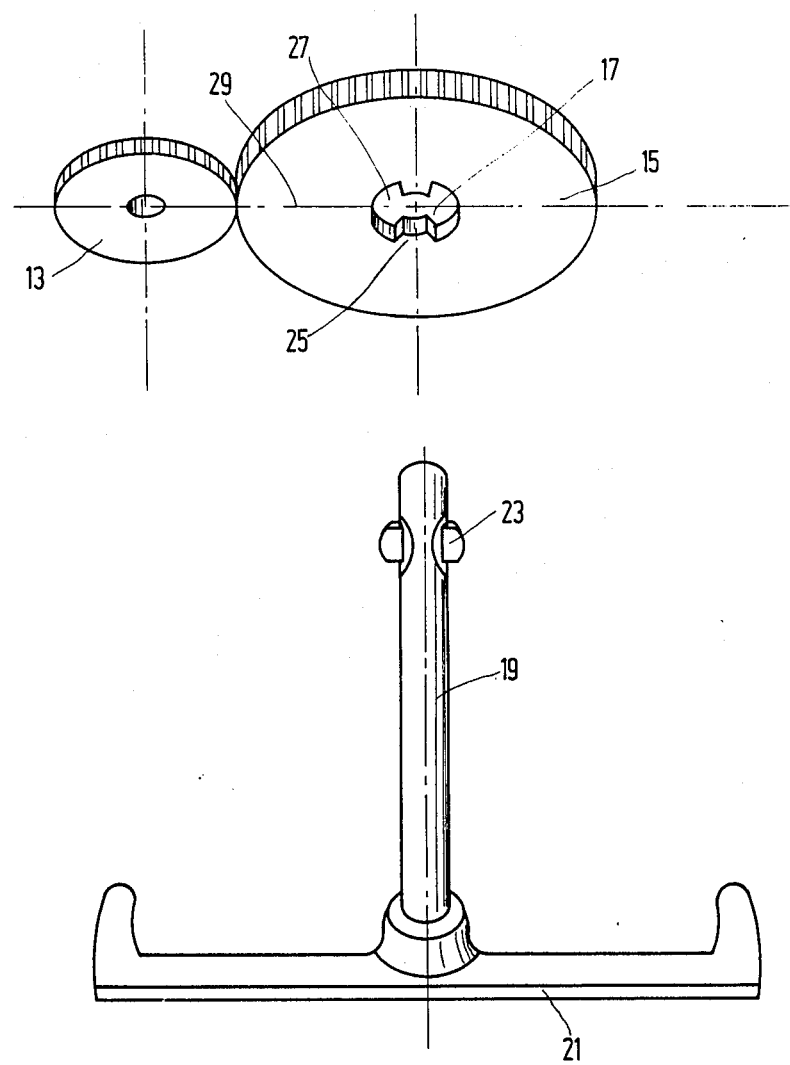

United States Patent [19]

Bertram et al.

[11] Patent Number: 4,759,192
[45] Date of Patent: Jul. 26, 1988

[54] DOMESTIC APPLIANCE COMPRISING A TOOL

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corp., New York, N.Y.

[21] Appl. No.: 35,102

[22] Filed: Apr. 6, 1987

[30] Foreign Application Priority Data

Apr. 4, 1986 [DE] Fed. Rep. of Germany ....... 3611252

[51] Int. Cl.$^4$ .............................................. A23G 9/12
[52] U.S. Cl. ..................... 62/136; 318/282; 366/601; 464/160
[58] Field of Search ................... 318/282; 62/136, 342; 366/601; 464/160

[56] References Cited

U.S. PATENT DOCUMENTS

| Re. 26,093 | 10/1966 | Ingram | 464/160 X |
| 3,347,451 | 10/1967 | Vind | 464/160 X |
| 3,408,830 | 11/1968 | Sutaruk et al. | 464/160 X |
| 3,926,414 | 12/1975 | Tanguy | 62/136 X |
| 4,205,535 | 6/1980 | Maurer | 62/342 |
| 4,402,194 | 9/1983 | Kuwako et al. | 62/353 |
| 4,696,166 | 9/1987 | Bukoschek et al. | 62/136 |

Primary Examiner—William E. Tapolcai
Attorney, Agent, or Firm—Ernestine Bartlett

[57] ABSTRACT

A domestic ice-cream maker comprises a refrigerated bowl-shaped container for an ice-cream mass; a rotatable stirring tool associated with such container for scraping off ice-cream freezing at a refrigerated surface of the container; and a single-phase synchronous motor for rotating the stirring tool, such motor having a maximum permissible operating temperature for making the ice-cream. A transmission path including a reduction mechanism extends between the synchronous motor and the stirring tool. Backlash is provided in the reduction mechanism as overload protection for the synchronous motor, the backlash acting in both directions of rotation of the motor and corresponding in each such direction of rotation to at least 10 revolutions of the motor, the motor, upon being blocked in either direction of rotation, reversing its direction of rotation and passing through the range of the backlash without exceeding its maximum permissible operating temperature.

6 Claims, 2 Drawing Sheets

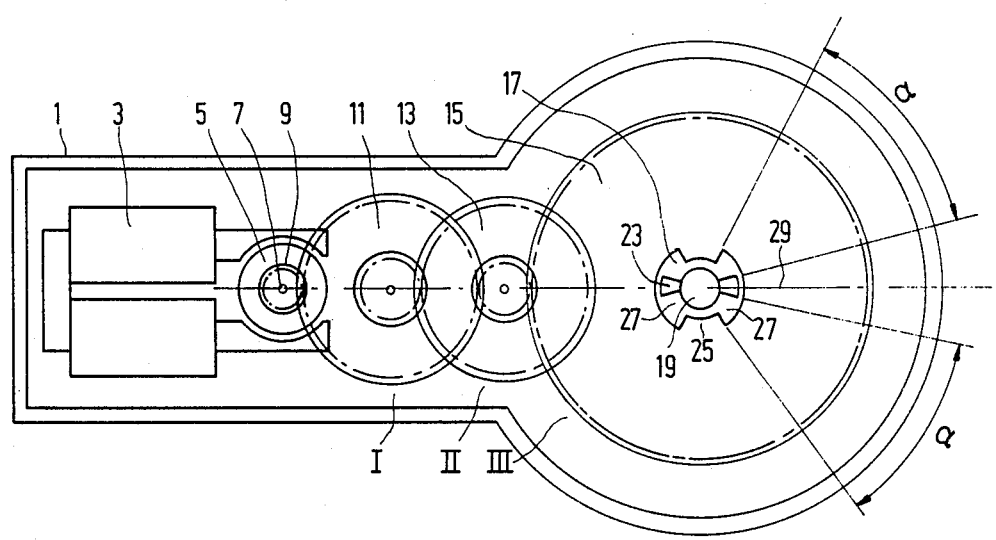
FIG. 1
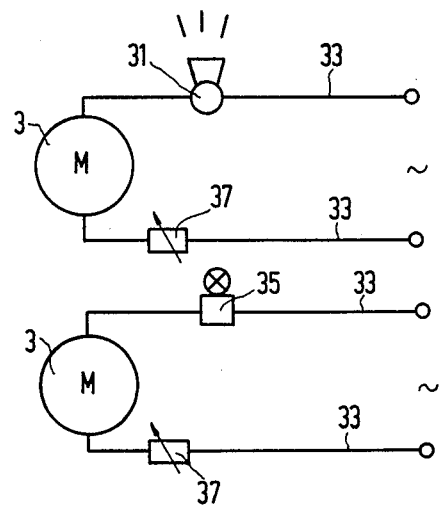
FIG. 3a
FIG. 3b

DOMESTIC APPLIANCE COMPRISING A TOOL

This invention relates to a domestic appliance, in particular an ice-cream maker having a tool which is driven by a single-phase synchronous motor via a reduction mechanism.

In electrical domestic appliances in which an electric motor drives a tool, the tool may become blocked during operation. After a short time this blocking may result in the motor coils being burnt but unless steps are taken to preclude overheating of the coils. In order to preclude burning out of the motor coils, which may also give rise to the applicance being burnt, the maximum permissible coil temperatures under different operating conditions are specified. It is customary to include a thermal cut-out in the motor circuit. This cut-out interrupts the motor current when the coils reach a specific temperature. However, such a cut-out constitutes an additional part to be mounted, which increases the production cost of the appliance.

It is known to drive electrical domestic appliances by means of single-phase synchronous motors. These single-phase synchronous motors have the property that in the event of overloading of the drive shaft in one direction of rotation they change their direction of rotation and start in the opposite direction if the load in thie direction is smaller. For example, if the tool can operate in two directions, the reversal of the direction of rotation causes the operating direction to be changed, so that blocking in one direction ceases.

From U.S. Pat. No. 4,520,286 it is known to utilize the reversal of the direction of rotation of a single-phase synchronous motor for driving the pressing cone of a citrus press. For this purpose an artificial backlash is introduced between the motor shaft and the pressing cone.

It is the object of the present invention to provide a domestic appliance of the type described above in which, when the maximum permissible motor torque is exceeded and the tool is consequently stalled, the motor is not thermally damaged even through the customary electrical safety devices are not utilized.

In accordance with the invention this object is achieved in that, as overload protection for the motor in the transmission path between the single-phase synchronous motor and the tool, backlash is provided which acts in both directions of rotation in such a way that when the tool is blocked the rotor of the motor changes to a reversing mode of operation in which it passes through the backlash range in alternate directions without the permissible operating temperature being exceeded.

If the single-phase synchronous motor stalls when the tool is blocked or impeded it will restart in the opposite direction on account of the predetermined backlash and will rotate until it is again forced to reverse when the tool is impeded or blocked. If the backlash is large enough the permissible operating temperature will not be exceeded.

In a further embodiment of the invention the backlash is provided at the driven gear wheel of the first or a subsequent stage of the reduction mechanism in such a way that the motor performs more than one revolution in either direction of rotation. Suitably, the backlash is selected to be such that the rotor of the motor can perform at least 10 revolutions in either direction of rotation before it reverses. Between the reversal points the operating current of the motor is so small that no overheating occurs although the motor is not switched off.

In accordance with a further embodiment of the invention, in a domestic appliance for the preparation of ice-cream, comprising a cooled bowl-shaped container for the ice-cream mass in which container a stirring tool rotates, the free rotation of the rotor in either direction of rotation is 25 to 50 revolutions when the stirring tool rotates at 18 to 30 revolutions per minute and the reduction ratio between the motor shaft and the gear wheel where the backlash is introduced is approximately 1:100 to 1:170. In an ice-cream maker the stirring tool is likely to be blocked because the ice-cream maker is required to operate in the range in which the ice-cream mass freezes at the cold surface but does not freeze onto this surface. The backlash thus always ensures an adequate rotation of the motor no matter whether the stirring tool can revolve or freezes up, so that the motor always operates below its permissible operating temperature and thermal protection by means of a special cut-out is not necessary.

When the single-phase synchronous motor stalls at both ends of the backlash range, this is audible and is a sign to the user that the stirring tool is not rotating.

In a single-phase synchronous motor the current in the motor coils increases at the instant at which the direction is reversed. In a further embodiment of the invention this increase of the current in the motor coils when the direction is reversed is utilized to generate warning signals. There warning signals may be of an optical, acoustic or electronic type.

In a further embodiment of the invention the actuating rotation-direction reversal threshold initiated by stalling of the motor is adjustable, in which case it is particularly advantageous if such actuating threshold can be adjusted to the desired solidity of the ice-cream.

The invention will now be described in more detail with reference to the accompanying drawings, in which:

FIG. 1 is a diagrammatic plan view of a multi-stage reduction mechanism of an electrical domestic appliance in which backlash is provided between the last stage of the reduction mechanism and the tool to be driven, FIG. 2 is an exploded view of the parts which cooperate with the backlash, such as the last gear wheel of the reduction mechanism and the tool driven by this gear wheel, and FIGS. 3a and 3b respectively show circuits for switching on a warning tone or a warning light in case of a current increase at the reversal points.

A housing 1 accommodates a single-phase synchronous motor 3 which by means of its rotor 5 and a gear wheel 9 mounted on the rotor shaft 7 drives the gear wheels 11, 13 and 15 of a gear mechanism comprising three stages I, II and III. The last gear wheel 15 is formed with a bore 17 which is engageable by a drive shaft 19 of a tool. If the housing 1 and the gear mechanism 9 to 15 in the housing form part of an ice-cream maker the drive shaft 19 constitutes the shaft of a stirring tool 21 by means of which ice cream freezing at a refrigerated bottom surface of a bowl-shaped container can be scraped off.

When the temperature conditions are not observed exactly or when the maximum operating time is exceeded, it may happen that the tool 21 freezes up in the bowl-shaped container and thus becomes stuck. Should the connection between the drive shaft 19 and the gear wheel 15 be rigid, the single-phase synchronous motor would have only a small backlash range constituted by the backlash of the gear wheels 9 to 15. As a result, the rise in current in the motor coils at the instant at which the direction of rotation is reversed would then recur at such a rate that the motor would be overheated. This overheating can be precluded by electrical means only by the use of a thermal cut-out which switches off the motor in case of impermissible heating.

In accordance with the invention a backlash range α of approximately 50° is provided between the gear wheel 15 and the drive shaft 19 in each direction of rotation. This backlash range is obtained in that on opposite sides of the drive shaft 19 projections 23 are formed in line with each other. In the bore 17 further projections 25 are formed which project into the bore 17 from opposite sides. In the areas 27 between the projections 25 the projections 23 can rotate freely through approximately 50° relative to a centre position represented by the line 29 before they respectively abut against a projection 25.

When it is assumed that the overall backlash range is approximately 100° and the rotor, which rotates at 3000 revolutions per minute, drives the gear wheel 15 at approximately 21 revolutions per minute, one revolution of the gear wheel 15 corresponds to approximately 143 revolutions of the rotor 5. In the case of a backlash range of 100° the rotor 5 will perform approximately 40 revolutions to cover the backlash range when the gear wheel 15 is blocked. This number of revolutions is adequate to ensure that the motor current does not become too large when the drive shaft 19 is blocked. A thermal cut-out is therefore not necessary.

At the points where its direction of rotation is reversed the single-phase synchronous motor draws more current. The resulting current pulses may be utilized for generating warning signals, for example a whistling tone or the like. FIG. 3a shows a diagram of a suitable circuit comprising a signal generator 31 arranged in the supply lines 33 of the motor 3. When the current pulses appear at the instants of reversal the signal generator 31 is energized and produces a hooting tone, which is repeated upon the next current pulse.

FIG. 3b shows a similar circuit comprising an incandescent lamp 35 which lights up at the instants at which the current pulses occur. The consecutive current pulses then result in repeated lighting-up and provide a distinct warning sign.

It may be desirable to adjust the threshold value at which the single-phase synchronous motor should stall. This is readily possible by arranging a variable resistor 37 in the relevant motor circuit. In an ice-cream maker this enables, for example, the degree of solidity of the ice-cream or soft-ice to be determined.

What is claimed is:

1. A domestic ice-cream maker, which comprises a refrigerated bowl-shaped container for an ice-cream mass; a rotatable stirring tool associated with said container for scraping off ice-cream freezing at a refrigerated surface of said container; a single-phase synchronous motor for rotating said stirring tool, said motor having a maximum permissible operating temperature for making the ice-cream; a transmission path including a reduction mechanism between the synchronous motor and the stirring tool; and backlash provided in said reduction mechanism as overload protection for the synchronous motor, said backlash acting in both directions of rotation of the motor and corresponding in each such direction of rotation to at least 10 revolutions of the motor, said motor, upon being blocked in either direction of rotation, reversing its direction of rotation and passing through the range of the backlash without exceeding its maximum permissible operating temperature.

2. A domestic ice-cream maker according to claim 1, in which the free rotation of the motor in each direction of rotation is 25 to 50 revolutions when the stirring tool is rotated at 18 to 30 revolutions per minute and the reduction ratio between the motor and the stirring tool is approximately 1:100 to 1:170.

3. A domestic ice-cream maker according to claim 1, which includes means to utilize the increase in current through the motor when the direction of rotation is reversed for generating a warning signal.

4. A domestic ice-cream maker according to claim 3, in which said utilizing means generates an optical warning signal or an acoustic warning signal.

5. A domestic ice-cream maker according to claim 1, which includes means to adjust the actuating rotation-direction reversal threshold initiated by stalling of the motor.

6. A domestic ice-cream maker according to claim 4, in which the adjustable means comprises a variable resistor arranged in the motor circuit.

* * * * *